COMPOSITE POLYOLEFIN EXTRUSION COATING OF SUBSTRATES

Filed March 15, 1968

LOUIS F. ERB
*INVENTOR.*

BY

ATTORNEY

United States Patent Office 3,547,682

Patented Dec. 15, 1970

3,547,682
COMPOSITE POLYOLEFIN EXTRUSION COATING OF SUBSTRATES

Louis F. Erb, Nixon, N.J., assignor to Hercules Incorporated, Wilmington, Del., a corporation of Delaware Filed Mar. 15, 1968, Ser. No. 713,527
Int. Cl. B44d *1/16*; B32b *27/32*; B39b *15/08*
U.S. Cl. 117—75 9 Claims

ABSTRACT OF THE DISCLOSURE

A process for the extrusion coating of substrates, such as paper and metal foil, which comprises extruding together as a composite coating a difficultly extrudable polymer selected from the group consisting of high density polyethylene and crystalline polypropylenes and a readily extrudable polymer selected from the group consisting of low density polyethylene and ethylenevinyl acetate copolymers.

Figure 1:
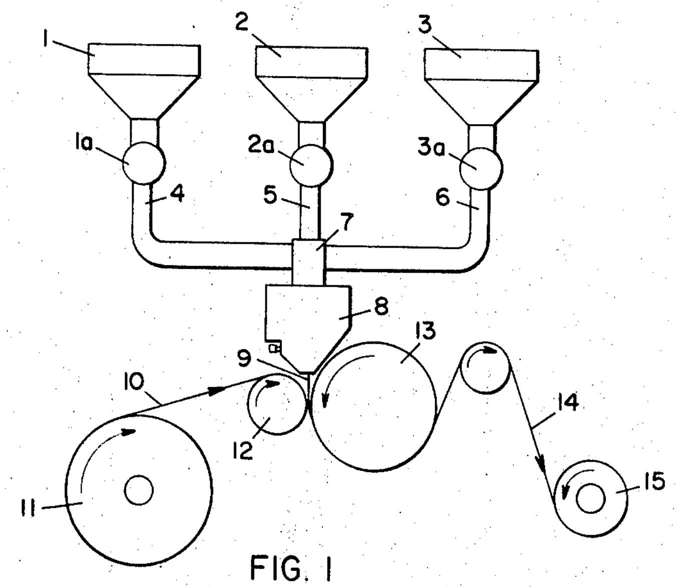

The present invention relates to the art extruding resinous coatings on webbed substrates such as paper and metal foil.

Resinous compositions particularly suitable for coating paper or similar webbed substrates are many and varied and include polymers of 1-olefins such as polyethylene. The coating of paper with polyethylene is, for example, well known, and the extrusion process for application of such coatings has been highly developed. When high speeds are desired in the application of the coatings, and particularly at low coating weights, these procedures have been conventionally limited to the use of a polyethylene having a density less than about 0.93 of the type commonly known as low density or high pressure polyethylene.

There are existent many other polymers such as high density polyethylene and crystalline polypropylenes which should be of great value in the extrusion coating art but which are so deficient in processability or extrudability that their utility is limited. Both such polymers have, for instance, better resistance to penetration by oil or moisture and better abrasion resistance than low density polyethylene. However, they are, as a class, much more difficult to extrude at the rates and weights necessary for coating such substrates as paper. When extruded at the speeds and weights encountered in paper coating, these polymers exhibit the phenomenon known as draw-down surging which results in edge weave and consequently nonuniform coating.

There have been attempts to obtain the advantages of high density polyethylene and crystalline polypropylenes in extrusion coating by modifying their properties either chemically or by addition of additives, or both. However, such attempts sacrifice to at least some degree the desirable properties of these polymers.

In accordance with the present invention it has been found that if high density polyethylene or a crystalline polypropylene is extruded as a composite coating in combination with a readily extrudable polymer, such as low density polyethylene, extrusion coating can be accomplished at commercially feasible rates even when the high density polyethylene or polypropylene constitutes a substantial portion, or even the major portion, of the composite coating. By composite extrusion is meant a process in which two or more different polymers are extruded through a single die in such manner that the polymers emerge from the die as distinct layers intimately joined to each other. Composite extrusion processes are now well known in the art. For the most part, composite extrusion has been used for making self-supporting laminar films. However, composite extrusion has been employed in the coating art, especially in the application of resinous layers to photographic film base, to a limited degree. It has heretofore not been recognized that composite extrusion can be applied in the coating art in the manner prescribed by the present invention to render the use of difficultly extrudable polymers feasible.

Describing extrusion coating generally, molten polymer is extruded through a slot die at an elevated temperature. While in the molten state, it is drawn through the nip of two rolls together with the substrate. Pressure is applied by the rolls to effect lamination with one roll being water cooled to solidify the polymer, and the other roll, which is conventionally made of rubber or similar compressible material, operating to hold the substrate against the polymer. The rolls are seated as closely as possible to the die and are so disposed that the polymer contacts the substrate just before the nip of the rolls. The cold or chill roll, as it is more commonly called, is cooled in such a manner that the temperature of its surface is below that at which the polymer is sticking. Also, the chill roll is equipped with a variable speed drive so that the extruded polymer can be drawn to the desired thickness. The composite extrusion coating of the present invention is carried out in the aforesaid manner except that two or more polymers are extruded in laminar flow through the die with the result that a laminar coating is applied to the substrate.

Figure 2:
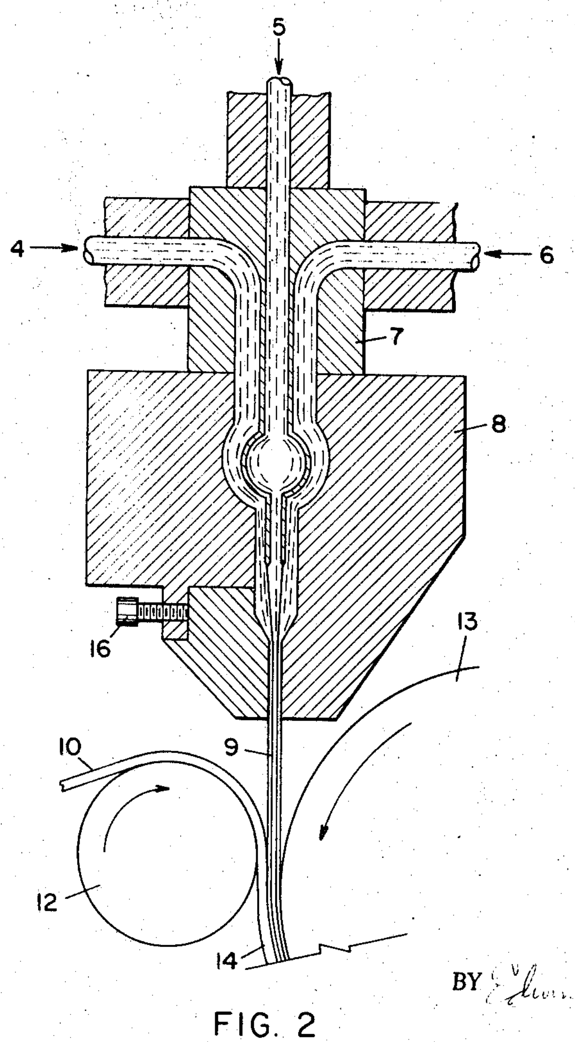

The invention is more fully illustrated in the attached drawing of which FIG. 1 is a schematic view of the overall process, whereas FIG. 2 is a cross-sectional view of the composite die showing emergence of laminar coating from the die and contact of the coating with the substrate just prior to entering the nip of the chill roll and associated nip roll.

Referring more particularly to the drawings, numerals 1, 2 and 3 designate hoppers which feed corresponding extruders 1*a*, 2*a* and 3*a*. Numerals 4, 5 and 6 designate the path of polymer melt emerging respectively from extruders 1*a*, 2*a* and 3*a*. Numeral 7 designates a multilayer adapter which is joined to multilayer die 8. The laminar or multilayer extrudate 9 upon emerging from the die 8 is shown to contact the substrate 10, which is supplied from storage roll 11, at a point just prior to the nip of chill roll 13 and nip roll 12. Together the extrudate and substrate combine in the nip of the rolls and emerge as coated substrate 14 and are wound on wind-up roll 15. Numeral 16 designates an adjusting screw which can be used to vary the width of the die opening.

In the operation of the apparatus depicted in the drawing it is obvious, of course, that the same or different polymers can be fed to hoppers 1, 2 and 3. The invention requires the employment of two different polymers, and in the use of the apparatus depicted in the drawing it is preferred that the difficultly extrudable polymer be fed to hopper 2 and that the more readily extrudable polymer be fed to both hoppers 1 and 3. The invention, however, is obviously not limited to a tri-layer system as shown in the drawing but is operable with almost equal effect in a bilayer system. Although a bi-layer die has not been shown, such dies are well known in the art.

As the difficultly extrudable polymer, there can be employed in the invention either high density polyethylene or a crystalline polymer of propylene. High density polyethylene which is characterized by a density greater than 0.94 g./cc. is made by either the so-called Ziegler process or the so-called Phillips process, the former process employing a transition metal compound such as titanium trichloride in combination with an organoaluminum compound as the catalyst system and the latter employing as the catalyst an oxide of chromium distributed on a support such as silica. The propylene polymers which can be employed in the invention include crystalline polypropylene, otherwise known as isotactic polypropylene, and crystalline copolymers of propylene with up to about 25 mole percent of ethylene, which copolymers can be either random or block copolymers and are obtainable by methods well known in the art.

As the readily extrudable polymers for use in the invention, it is preferred to employ low density polyethylene, i.e., relatively highly branched polyethylene, which has a maximum density of about 0.94 g./cc. Other readily extrudable polymers which can be employed include copolymers of ethylene with a minor amount of vinyl acetate and the ethylene polymers known as ionomers.

The invention can be used to coat any type of substrate which is susceptible to coating with low density polyethylene, such substrates most commonly being paper and metal foil. Generally, such coating is preformed at speeds of 400 ft. per minute and higher, and the thickness of the coatings varies from about 0.125 to about 2 mils, depending upon the purpose to be served by the coating. The purposes of the coating are numerous and varied; for example; the coating may be intended to make the substrate heat sealable or to render it impervious to oil, moisture or gas.

In order to achieve the benefits of the invention it is desirable that the difficultly extrudable polymer comprise at least 10%, or more preferably at least 20%, by volume of the total coating. When applying a tri-layer coating, best results are achieved when the difficultly extrudable polymer is the center layer, as this results in optimum coating speed and provides the additional advantage that the more readily extrudable polymer, which is more adherent to the usual substrates, contacts the substrate. In a bi-layer coating system it is usually desirable that the difficultly extrudable polymer comprise the outer layer and the readily extrudable polymer the inner layer which contacts the substrate. In this manner advantage is taken of the inherent greater adherence of the easily extrudable polymer to the substrate and the better abrasion resistance and surface properties of the difficultly extrudable polymer.

In order to illustrate the invention the following examples are given.

EXAMPLES

The apparatus employed was similar to that depicted in the drawing. Extruder 1*a* was a 2½" Davis standard extruder equipped with screws having a 26:1*L/D* ratio, and extruder 2*a* was a 4½" Beloit extruder equipped with a screw having a 24:1 *L/D* ratio. The chill roll temperature was 57° F. and the die to nip roll distance was about 4 inches. Each extruder was operated at a stock temperature of about 580° F. and a back pressure of 1000 p.s.i.g.

Employing this apparatus, kraft paper was coated with a tri-layer composite coating comprising low density polyethylene resin having a density of 0.916 g./cc. and a melt index (ASTM-D-1238-52T) of 12 as the two outer layers and isotactic polypropylene having a density of 0.905 and a melt flow of 8.4 as the center layer. The relative rates of extrusion of the two polymers were such that the coating comprised 25% by volume low density polyethylene on each of the chill roll and substrate sides of the coating with 50% by volume of polypropylene in the center layer. The speed of the traveling web of paper was increased from time to time until the point was reached at which surging began. The results are shown in the following table.

TABLE 1

| Coating speed (feet/min.) | Coating weight (pounds/ream) | Coating thickness (mils) | Processability |
|---|---|---|---|
| 140 | 31.3 | 2.20 | Good. |
| 280 | 14.7 | 1.04 | Do. |
| 375 | 10.1 | 0.71 | Do. |
| 500 | 8.2 | 0.58 | Do. |
| 660 | 5.0 | 0.35 | Do. |
| >550 | | | Surging begins. |

To illustrate the advantages of the invention, the apparatus was operated in the same manner except that the same polypropylene as above identified was fed to all three extruders and thus comprised the entire coating. The results were as follows:

TABLE 2

| Coating speed (feet/min.) | Coating weight (pounds/ream) | Coating thickness (mils) | Processability |
|---|---|---|---|
| 140 | 25.2 | 1.80 | Slight surge. |
| 280 | | | Severe surge. |

When the example is repeated using high density polyethylene in place of polypropylene, similar results are obtained. A coating speed in excess of 400 feet per minute is achievable whereas using high density polyethylene alone, surging is encountered at 200 feet per minute.

Similar results to the example are achieved when apparatus similar to that depicted in the drawing is employed to coat kraft paper with a bi-layer composite coating by extruding polypropylene in extruder 1*a* and low density polyethylene in extruders 2*a* and 3*a*, with the polyethylene layer contacting the paper.

In place of kraft paper as the substrate, aluminum foil is used satisfactorily.

What I claim and desire to protect by Letters Patent is:

1. A coating process which comprises extruding directly onto a paper or metal foil substrate a composite coating comprising a difficultly extrudable polymer selected from the group consisting of high density polyethylene and crystalline polypropylenes and a readily extrudable polymer selected from the group consisting of low density polyethylene and ethylene-vinyl acetate copolymers to form on said substrate a coating composed of plural distinct layers of the polymers with said readily extrudable polymer being in direct contact with the substrate.

2. The process of claim 1 in which the difficultly extrudable polymer is high density polyethylene.

3. The process of claim 1 in which the difficultly extrudable polymer is isotactic polypropylene.

4. The process of claim 1 in which the readily extrudable polymer is low density polyethylene.

5. The process of claim 1 in which the substrate is paper.

6. The process of claim 1 in which the substrate is metal foil.

7. The process of claim 1 in which the difficultly extrudable polymer comprises at least 10% by volume of the composite coating.

8. The process of claim 1 in which the coating is extruded as a tri-layer composite with the difficultly extrudable polymer comprising the inner layer and the readily extrudable polymer comprising both outer layers.

9. The process of claim 1 in which the coating is extruded as a bi-layer composite.

References Cited

UNITED STATES PATENTS

| | | | |
|---|---|---|---|
| 3,341,388 | 9/1967 | Bunyea | 117—155UX |
| 3,341,388 | 9/1967 | Bunyea | 17—155 UX |
| 3,371,002 | 2/1968 | Reddeman | 117—161UHHX |
| 3,381,717 | 5/1968 | Tyrrel | 161—252X |
| 3,418,396 | 12/1968 | Edwards et al. | 117—161UHHX |
| 3,206,323 | 9/1965 | Miller et al. | 117—34 |

WILLIAM D. MARTIN, Primary Examiner

RALPH HUSACK, Assistant Examiner

U.S. Cl. X.R.

118—13; 117—76, 132, 155

UNITED STATES PATENT OFFICE

CERTIFICATE OF CORRECTION

Patent No. 3,547,682 Dated December 15, 1970

Inventor(s) Louis F. Erb

It is certified that error appears in the above-identified patent and that said Letters Patent are hereby corrected as shown below:

Column 3, in Table 1, under "Coating Speed"; Next to last item "660" should read -- 650 --; Last item ">55 should read -- >650 --. Column 4, line 62, "3,341,388 9/1967 Bunyea----17-155 UX" should read -- 2,761,791 9/1956 Russell----117-34 --.

Signed and sealed this 23rd day of March 1971.

(SEAL)
Attest:

EDWARD M.FLETCHER,JR.
Attesting Officer

WILLIAM E. SCHUYLER, JR
Commissioner of Patents